Sept. 22, 1959 J. J. KAMP 2,905,896
RING MODULATOR PHASE COMPARATOR
Filed May 2, 1956

INVENTOR

BY Johannes Jacobus Kamp
Marshall, Marshall & Yeasting
Attorneys

United States Patent Office

2,905,896
Patented Sept. 22, 1959

2,905,896

RING MODULATOR PHASE COMPARATOR

Johannes Jacobus Kamp, Amsterdam, Netherlands

Application May 2, 1956, Serial No. 582,104

Claims priority, application France May 11, 1955

4 Claims. (Cl. 324—87)

The invention relates to a ring modulator circuit as used for phase-sensitive detection behind a measuring amplifier.

With a good measuring amplifier the output signal has to be accurately proportional to the input signal. The amplifier may be made sufficiently linear by applying negative voltage-feed back. The use of a ring modulator for phase-sensitive detection, however, introduces by the non-linear properties of the rectifier-cells an error which cannot be corrected by said negative feed-back.

The invention will be elucidated by the drawing.

Figure 1:
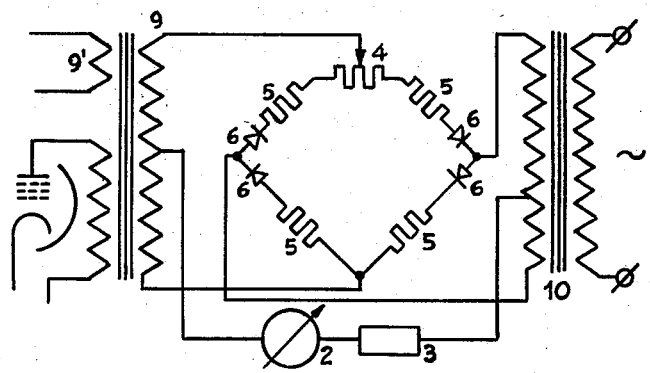
Fig. 1 shows a part of customary ring modulator for phase-measurements coupled to the output stage of an amplifier.

Fig. 1 shows the usual arrangement in which in the output circuit of the ring modulator 1 a ma. meter 2 and a milliampere-hour-counter 3 are inserted.

Besides said linearity-errors the ring modulator shows a zero-point deviation as a result of uneven heating of the rectifier cells 6, when controlling the circuit and with uneven ageing of the cells. In order to be able to correct this, in Fig. 1 the potentiometer 4 is inserted. In practice it appears that the suppressing of the zero point-deviation and the reduction of the non-linear properties of the cells by means of the series resistances 5 at the cells 6 do not suffice. It is not possible to unlimitedly increase the values of the resistances because the blocking resistance of the cell 6 makes a limit to same. The output transformer 9 is provided with an additional primary winding 9′ which gives the negative voltage feedback. The transformer 10 is connected primarily to the mains.

Figure 2:
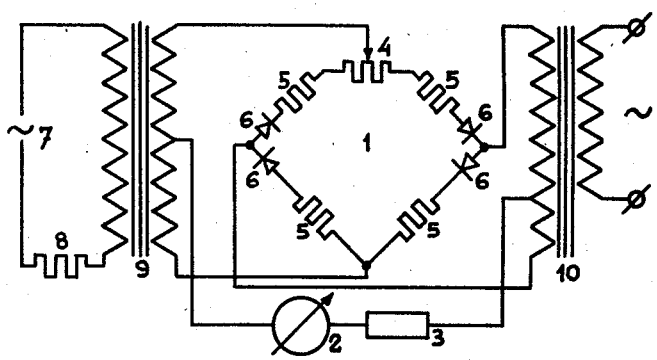
Fig. 2 is a modification of the circuit of Fig. 1.

However, the problem may be approached from another side. If the measuring signal is supplied to the ring modulator from a voltage source 7 having a high internal resistance 8 according to Fig. 2, the same effect is provided as when resistances in series with the cells are inserted. The resistances 5 in series with the cells 6, however, cannot entirely be deleted, because the resistances of meter 2 and counter 3 cannot be neglected. However, these resistances are not chosen higher than is necessary for adjusting the relation between cell-current and diagonal current (meter-current). The circuit retains the drawbacks of additional losses in the internal resistance 8 of voltage source 7, whilst the leakage-currents of the cells still influence the output current and the self-induction of the transformer 9 puts a limit to the obtainable internal resistance of the voltage source 7.

From the electronics it is known that the internal resistance of the amplifier-output may be strongly increased by applying a negative current feed-back. In so doing besides over this apparent resistance no losses occur, so that additional energy losses are avoided.

The circuit according to the invention gives the possibility of obtaining a sinusoidal negative feed-back signal, which is an accurate reproduction of the current through the meter 2, notwithstanding the fact that in the ring modulator there are merely pulsating direct currents. Since the leakage currents of the cells 6 which directly influence the meter-current are present in the negative feed-back signal as well, also the influences of these currents when applying a high negative feed-back factor are substantially eliminated.

Figure 3:
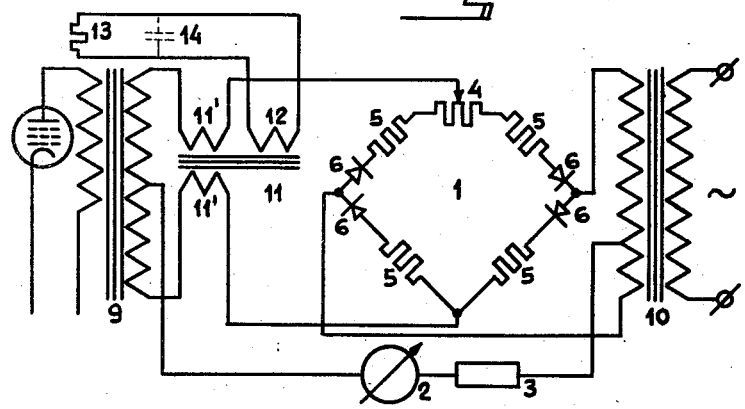
Fig. 3 is a modification according to the invention of Fig. 1.

The circuit according to the invention is shown in Fig. 3.

For obtaining the negative feed-back signal in each supply line of the transformer 9 to the ring modulator 1 a primary winding 11′, 11′ of a current transformer 11 is inserted.

Through each primary winding then a pulsating direct current passes having a frequency the same as that of the mains. With a correct connection of the two mentioned windings, in the third winding 12 of the transformer 11, connected to a resistance 13, there will be a sinusoidal alternating voltage. If the resistance 13 is a resistance with a negligible temperature coefficient, the voltage across this resistance will accurately correspond with the output current (diagonal current) of the ring modulator 1, consequently with the current through the meter 2.

If mu-metal is used as a core-material for the current transformer the inductance of said transformer may be considerable. This is very desirable since this inductance, shunted by the transformed resistance 13 is added to the source-impedance through which the ring modulator is fed. This impedance of the transformer 11 may, if desired, still be increased by tuning one of the windings, e.g. 12, with condenser 14. If a high negative feed-back factor is applied the potentiometer 4 may be cancelled.

I claim:

1. A phase comparison circuit comprising a first centertapped transformer to be connected to a source of reference signals, an amplifier to be connected to a source of unknown signals, a second centertapped transformer connected as the output transformer of the amplifier, a measuring device connected between the centertaps of said first and second transformers, a ring modulator-rectifying unit of which two opposed terminals are connected to the outer terminals of said first transformer, a current transformer having a pair of primary windings and a secondary winding, each of the other two terminals of said unit being connected via one of two primary windings of the current transformer to the outer terminals of said second transformer, the connection of said primary windings being such that in the secondary winding of the current transformer a signal is generated of which the waveform conforms substantially to the output waveform of the amplifier, said signal being applied as a negative current feedback signal to said amplifier.

2. A phase comparison circuit comprising a first centertapped transformer to be connected to a source of reference signals, an amplifier to be connected to a source of unknown signals, a second centertapped transformer connected as the output transformer of the amplifier for the signals of which the phase is to be compared, a measuring device connected between the centertaps of said first and second transformers, a ring modulator-rectifying unit of which two opposed terminals are connected to the outer terminals of said first transformer, a current transformer having a pair of primary windings and a secondary winding, each of the other two terminals of said unit being connected via one of two primary windings of the current transformer to the outer terminals of said second transformer, the connection of said primary windings being such that in the secondary winding of the current transformer a signal is generated of which the waveform conforms substantially to the output waveform of the amplifier, a resistor of negligible temperature coefficient connected across said secondary winding, said signal being applied as a negative current feedback signal to said amplifier.

3. A phase comparison circuit comprising a first centertapped transformer adapted to be connected to a source of reference signals, an amplifier adapted to be connected to a source of unknown signals, a second centertapped transformer connected as the output transformer of the amplifier, a measuring device connected between the centertaps of said first and second transformers, a ring modulator-rectifying unit of which two opposed terminals are connected to the outer terminals of said first transformer, a current transformer having a pair of primary windings and a secondary winding, each of the other two terminals of said unit being connected via one of two primary windings of the current transformer to the outer terminals of said second transformer, the connection of said primary windings being such that in the secondary winding of the current transformer a signal is generated of which the waveform conforms substantially to the output waveform of the amplifier, a capacitor connected across said secondary winding for tuning the current transformer to the signal generated therein, said signal being applied as a negative current feedback signal to said amplifier.

4. A phase comparison circuit comprising a first centertapped transformer adapted to be connected to a source of reference signals, an amplifier adapted to be connected to a source of unknown signals, a second centertapped transformer connected as the output transformer of the amplifier, a measuring device connected between the centertaps of said first and second transformers, a ring modulator-rectifying unit of which two opposed terminals are connected to the outer terminals of said first transformer, a current transformer having a pair of primary windings and a secondary winding, each of the other two terminals of said unit being connected via one of two primary windings of the current transformer to the outer terminals of said second transformer, the connection of said primary windings being such that in the secondary winding of the current transformer a signal is generated of which the waveform conforms substantially to the output waveform of the amplifier, a resistor of negligible temperature coefficient connected across said secondary winding, a capacitor connected across said secondary winding for tuning the current transformer to the signal generated therein, said signal being applied as a negative current feedback signal to said amplifier.

References Cited in the file of this patent
UNITED STATES PATENTS

| | | |
|---|---|---|
| 2,324,815 | Black | July 20, 1943 |
| 2,412,345 | Lindenblad | Dec. 10, 1946 |
| 2,462,093 | Grimes | Feb. 22, 1949 |
| 2,551,291 | Rich | May 1, 1951 |
| 2,641,695 | Lovell | June 9, 1953 |
| 2,729,972 | Schwidetzky | Jan. 10, 1956 |
| 2,774,932 | Patton | Dec. 18, 1956 |